US 12,492,979 B2

(12) United States Patent
Burke et al.

(10) Patent No.: US 12,492,979 B2
(45) Date of Patent: Dec. 9, 2025

(54) SYSTEMS, DEVICES, AND METHODS FOR LOW-COST RESPIRATOR EVALUATION

(71) Applicant: University of Maryland, College Park, College Park, MD (US)

(72) Inventors: Quinton Burke, Fallston, MD (US); Kevin Aroom, Silver Spring, MD (US); Martha Wang, Fulton, MD (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 272 days.

(21) Appl. No.: 18/482,374

(22) Filed: Oct. 6, 2023

(65) Prior Publication Data
US 2024/0125686 A1    Apr. 18, 2024

Related U.S. Application Data

(60) Provisional application No. 63/378,613, filed on Oct. 6, 2022.

(51) Int. Cl.
*G01N 15/06* (2024.01)
*G01N 15/075* (2024.01)

(52) U.S. Cl.
CPC ....... *G01N 15/0618* (2013.01); *G01N 15/075* (2024.01)

(58) Field of Classification Search
CPC ............. G01N 15/0618; G01N 15/075; G01N 15/0826; G01N 2015/0846; G01N 2015/084
See application file for complete search history.

(56) References Cited

U.S. PATENT DOCUMENTS

| | | | |
|---|---|---|---|
| 6,242,209 B1 * | 6/2001 | Ransom | G01N 15/1404 435/283.1 |
| 2005/0229926 A1 * | 10/2005 | Fink | A61M 15/0085 128/200.16 |

(Continued)

OTHER PUBLICATIONS

Certitest Automated Filter Tester Model 8130A, TSI Understanding, Accelerated, www.tsi.com., pp. 1-4, 2018.

(Continued)

*Primary Examiner* — Sang H Nguyen
(74) *Attorney, Agent, or Firm* — George Likourezos; Carter, DeLuca & Farrell LLP

(57) ABSTRACT

A system for the evaluation of respirator materials includes an aerosolized particle source configured to selectively provide aerosolized particles, a mixing chamber including a drying apparatus, a vacuum source configured to control airflow, an airtight respirator chamber for evaluating respirator materials, a processor, and a memory. The airtight respirator chamber includes a first sub-chamber, a second sub-chamber, a first sensor and a second sensor. The memory includes instructions stored thereon, which when executed by the processor cause the system to: obtain the first signal and the second signal; determine an aerosol filtration efficiency based on a difference between the first signal and second signal; compare the aerosol filtration efficiency to a predetermined threshold; and provide an indication whether the aerosol filtration efficiency is above or below the predetermined threshold.

20 Claims, 9 Drawing Sheets

(56) References Cited

U.S. PATENT DOCUMENTS

| | | | | |
|---|---|---|---|---|
| 2005/0263150 | A1* | 12/2005 | Chathampally | A61M 16/06 |
| | | | | 128/200.14 |
| 2007/0267010 | A1* | 11/2007 | Fink | A61M 16/08 |
| | | | | 128/200.23 |
| 2013/0146053 | A1* | 6/2013 | Mazela | A61M 16/0858 |
| | | | | 137/15.01 |
| 2021/0055267 | A1* | 2/2021 | Zhang | G01N 30/8686 |

OTHER PUBLICATIONS

"100X Automated Filter Tester", Air Techniques International, info@atitest.com, pp. 1-4.

* cited by examiner

500 ⟶

Start

502 — Supply aerosolized particles by an aerosolized particle source

504 — Dry the aerosolized particles by a mixing chamber including a drying apparatus

506 — Control airflow of the aerosolized particles by a vacuum source

508 — Supply the aerosolized particles to an air-tight respirator chamber

510 — Generating, by a first sensor, a first signal indicating an amount of particulate matter upstream from a sample to be tested the first sensor disposed in a first sub-chamber of the air-tight respirator chamber

512 — Generating, by a second sensor, a second signal indicating an amount of particulate matter downstream from a sample to be tested, the second sensor disposed in a second sub-chamber of the air-tight respirator chamber

514 — Determine a filtration efficiency based on a difference between first signal and second signal

516 — Compare the filtration efficiency to a predetermined threshold

518 — Provide an indication whether the aerosol concentration is above or below the threshold

FIG. 5

| Testing Day | Avg. Differential Pressure (mmH2O) |
|---|---|
| Test Day 1 | -0.78 |
| Test Day 2 | -0.77 |
| Test Day 3 | -0.76 |
| Test Day 4 | -0.76 |
| Test Day 5 | -0.73 |

FIG. 7A

| Testing Day | Avg. % Difference Between Sensors |
|---|---|
| Test Day 1 | 1.45 |
| Test Day 2 | 2.44 |
| Test Day 3 | 2.62 |
| Test Day 4 | 3.32 |
| Test Day 5 | 1.67 |

FIG. 7B

SYSTEMS, DEVICES, AND METHODS FOR LOW-COST RESPIRATOR EVALUATION

CROSS-REFERENCE TO RELATED APPLICATION AND CLAIM OF PRIORITY

This application claims the benefit of, and priority to, U.S. Provisional Patent Application No. 63/378,613 filed on Oct. 6, 2022; the entire contents of which are hereby incorporated herein by reference.

TECHNICAL FIELD

The present disclosure relates generally to the field of respirator evaluation. More specifically, the present disclosure provides low-cost systems, devices and methods for the evaluation of respirator materials.

BACKGROUND

On Mar. 11, 2020, the World Health Organization (WHO) officially declared COVID-19 as a pandemic. Since then, there have been over 600 million cases and over 6 million deaths globally. The world has drastically changed since this announcement, and there is now a better understanding of the disease itself and prevention measures. Overall, SARS-CoV-2, the virus that causes COVID-19 infection, primarily spreads through tiny respiratory droplets that are released to the ambient environment when an infected individual coughs, sneezes, speaks, sings, or breathes. This transmission largely occurs through individuals being in close contact with each other, known as short-range aerosol transmission, or even through larger droplets that directly contact one's eye, nose, or mouth, known as droplet transmission.

Accordingly, there is interest in low-cost systems, devices and methods for the evaluation of respirator materials.

SUMMARY

Embodiments of the present disclosure are described in detail with reference to the drawings wherein like reference numerals identify similar or identical elements.

In accordance with aspects of the disclosure, a system for evaluation of respirator materials is presented. The system includes an aerosolized particle source configured to selectively provide aerosolized particles; a mixing chamber including a drying apparatus; a vacuum source configured to control airflow; an airtight respirator chamber; a processor; and a memory. The airtight respirator chamber includes a first sub-chamber; a first sensor configured to generate a first signal indicating an amount of particulate matter upstream from a sample respirator material being evaluated, the first sensor disposed in the first sub-chamber; a second sub-chamber; and a second sensor configured to generate a second signal indicating an amount of particulate matter downstream from the sample respirator material, the second sensor disposed in the second sub-chamber. The memory includes instructions stored thereon, which when executed by the processor, cause the system to: obtain the first signal and the second signal; determine an aerosol filtration efficiency based on a difference between the first signal and second signal; compare the aerosol filtration efficiency to a predetermined threshold; and provide an indication whether the aerosol filtration efficiency is above or below the predetermined threshold. The vacuum source includes a venturi vacuum pump uses positive pressure to generate a suction flow.

In accordance with aspects of the disclosure, the first sensor and the second sensor may be configured to measure light scattering.

In an aspect of the present disclosure, a rate of the airflow may be about 30 lpm.

In another aspect of the present disclosure, the airtight respirator chamber may further include: a first plate; a second plate configured to be compressed to the first plate; and a plurality of gaskets disposed on the first plate and the second plate. The plurality of gaskets may be configured to provide an airtight seal when in compression based on the airflow.

In yet another aspect of the present disclosure, the aerosolized particle source may include: an air source; a pressure regulator; and an aerosol generator.

In a further aspect of the present disclosure, the drying apparatus may include silica gel.

In yet a further aspect of the present disclosure, prior to testing, the sample respirator material is environmentally conditioned.

In accordance with aspects of the disclosure, the aerosolized particles may include neutralized sodium chloride.

In an aspect of the present disclosure, a size of the aerosolized particles may be a geometric mean of about 0.075 μm and a geometric standard deviation of about 2.

In another aspect of the present disclosure, the first sensor and the second sensor may be configured to detect aerosolized particles in a range of about 0.3 to about 10.0 μm.

In accordance with aspects of the disclosure, a processor implemented method for evaluating respirator materials is presented. The method includes: supplying aerosolized particles by an aerosolized particle source, wherein the airflow of the aerosolized particles is controlled by a vacuum source; drying the aerosolized particles by a mixing chamber including a drying apparatus; supplying the aerosolized particles to an airtight respirator chamber; generating, by a first sensor, a first signal indicating an amount of particulate matter upstream from a sample respirator material being evaluated, wherein the first sensor is disposed in a first sub-chamber of the airtight respirator chamber; generating, by a second sensor, a second signal indicating an amount of particulate matter downstream from the sample respirator material, wherein the second sensor is disposed in a second sub-chamber of the airtight respirator chamber; determining an aerosol filtration efficiency based on a difference between the first signal and second signal; comparing the aerosol filtration efficiency to a predetermined threshold; and providing an indication whether the aerosol filtration efficiency is above or below the predetermined threshold. The vacuum source includes a venturi vacuum pump uses positive pressure to generate a suction flow.

In yet another aspect of the present disclosure, the amount of particulate matter measured by the first sensor and the second sensor may be measured using light scattering.

In a further aspect of the present disclosure, the method may further include controlling a rate of the airflow to about 30 lpm.

In yet a further aspect of the present disclosure, the aerosolized particles may include neutralized sodium chloride.

In yet another aspect of the present disclosure, the first sensor and the second sensor may be configured to sense aerosolized particles with a geometric mean of about 0.075 μm and a geometric standard deviation of about 2.

In a further aspect of the present disclosure, the first sensor and the second sensor may be configured to detect particles in a range of about 0.3 to about 10.0 μm.

In yet a further aspect of the present disclosure, the method may further include manually compressing the sample between a first plate and a second plate of the airtight respirator chamber. A plurality of gaskets are disposed on the first plate and the second plate, the plurality of gaskets configured to provide an airtight seal when in compression based on the airflow.

In a further aspect of the present disclosure, the drying apparatus may dry the aerosolized particles using silica gel.

In a further aspect of the present disclosure, the method may further include prior to testing, environmentally conditioning the sample.

In accordance with aspects of the disclosure, a non-transitory computer-readable medium storing instructions that, when executed by a processor, cause the processor to perform a method for evaluation of respirator materials is presented. The method includes: supplying aerosolized particles by an aerosolized particle source; drying the aerosolized particles by a mixing chamber including a drying apparatus; controlling airflow of the aerosolized particles by a vacuum source; supplying the aerosolized particles to an airtight respirator chamber; generating, by a first sensor, a first signal indicating an amount of particulate matter upstream from a sample respirator material being evaluated, wherein the first sensor is disposed in a first sub-chamber of the airtight respirator chamber; generating, by a second sensor, a second signal indicating an amount of particulate matter downstream from the sample, wherein the second sensor is disposed in a second sub-chamber of the airtight respirator chamber; determining an aerosol filtration efficiency based on a difference between the first signal and second signal; comparing the aerosol filtration efficiency to a predetermined threshold; and providing an indication whether the aerosol filtration efficiency is above or below the predetermined threshold. The vacuum source includes a venturi vacuum pump uses positive pressure to generate a suction flow.

Further details and aspects of exemplary embodiments of the present disclosure are described in more detail below with reference to the appended figures.

BRIEF DESCRIPTION OF THE DRAWINGS

A better understanding of the features and advantages of the disclosed technology will be obtained by reference to the following detailed description that sets forth illustrative embodiments, in which the principles of the technology are utilized, and the accompanying drawings of which:

FIG. 5 is a flow diagram of the method for respirator evaluation using the system of FIG. 1, in accordance with aspects of the disclosure;

FIG. 7A is a graph illustrating test data results for particulate matter sensors of the system of FIG. 1, in accordance with aspects of the disclosure;

FIG. 7B is a graph illustrating test data results for the differential pressure sensor of the system of FIG. 1, in accordance with aspects of the disclosure;

DETAILED DESCRIPTION

Figure 1:
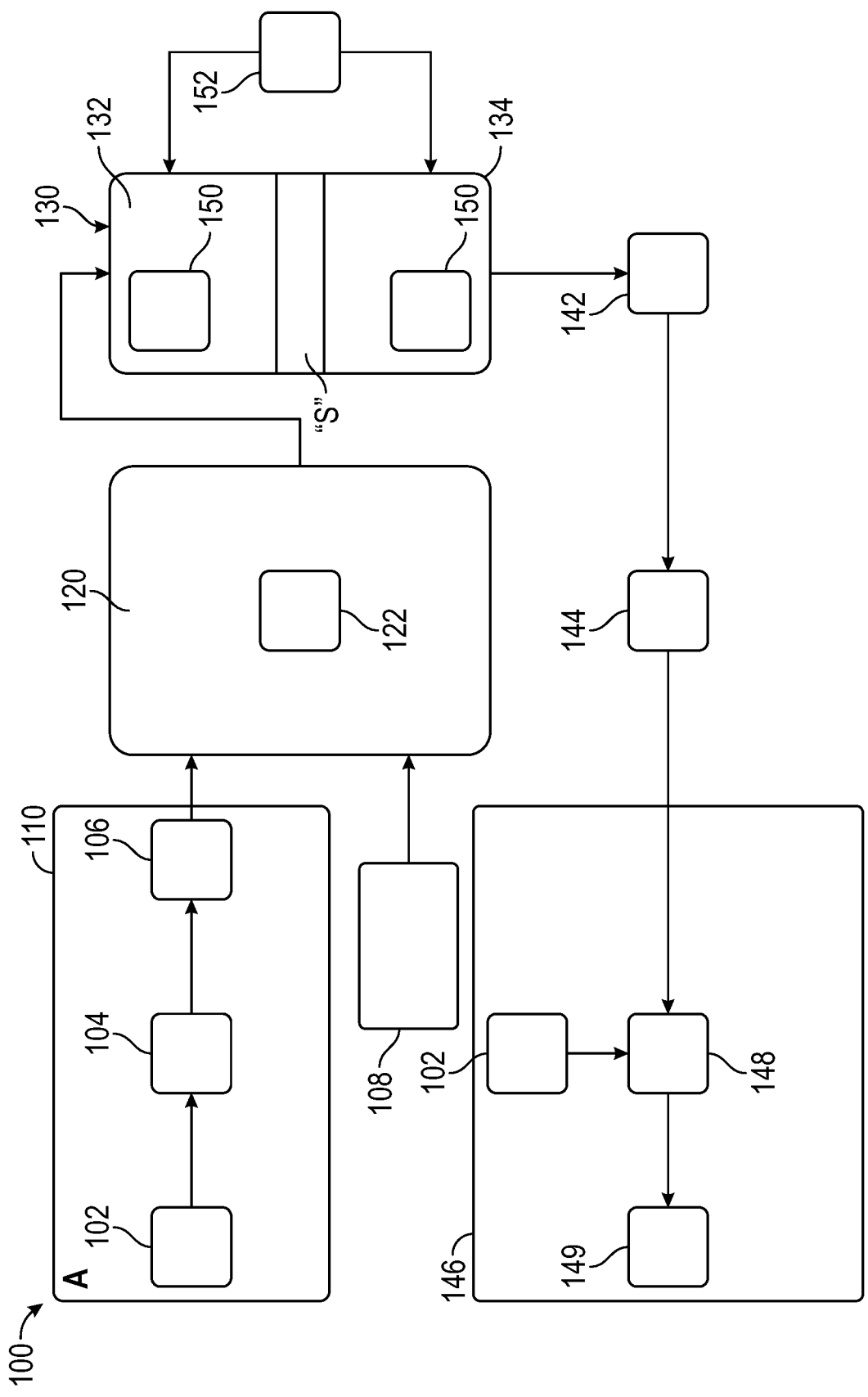
FIG. 1 illustrates a block diagram of a system for respirator evaluation, in accordance with the present disclosure.

The present disclosure relates generally to the field of respirator evaluation. More specifically, an aspect of the present disclosure provides low-cost systems, devices and methods for the evaluation of respirator materials.

Although the present disclosure will be described in terms of specific embodiments, it will be readily apparent to those skilled in this art that various modifications, rearrangements, and substitutions may be made without departing from the spirit of the present disclosure. The scope of the present disclosure is defined by the claims appended hereto.

For the purpose of promoting an understanding of the principles of the present disclosure, reference will now be made to exemplary embodiments illustrated in the drawings, and specific language will be used to describe the same. It will nevertheless be understood that no limitation of the scope of the present disclosure is thereby intended. Any alterations and further modifications of the inventive features illustrated herein, and any additional applications of the principles of the present disclosure as illustrated herein, which would occur to one skilled in the relevant art and having possession of this disclosure, are to be considered within the scope of the present disclosure.

National Institute for Occupational Safety and Health (NIOSH) regulations and test procedures are meant to represent a worst-case scenario, particularly with regard to filtration testing. This requires eliminating the natural attraction that occurs from filter media and particles being oppositely charged, thus making it harder for the filter to trap particles. Testing, therefore, requires that particles are at a neutral electrostatic charge. The 0.3 µm sized particles that define N95 performance have also been shown to be the most challenging to filter. NIOSH protocols thus require testing with neutralized sodium chloride (NaCl) aerosols with a geometric median of 0.075±0.020 µm and a geometric standard deviation not exceeding 1.86 delivered in a flow of air at 85±4 (±1.4 for resistance testing) liter per minute (lpm). There are also three main requirements for N95s that must be met to obtain NIOSH certification. These are a maximum allowable inhalation resistance (IR) of 35 millimeters of water (mmH2O), a maximum allowable exhalation resistance (ER) of 25 mmH2O, and a filtration efficiency (FE) greater than 95%.

In addition, KN95s must meet the Chinese regulations outlined in GB2626-2019 Respiratory Protection—Non-Powered Air-Purifying Particle Respirator. This protocol is similar to NIOSH protocols and requires testing with NaCl aerosols at a count median diameter of 0.075±0.020 µm and a geometric standard deviation not exceeding 1.86. At 85±4 (±1 for resistance testing) lpm flow, KN95s must provide greater than 95% FE and less than 210 Pascal of IR and ER. Resistance across the mask is correlated with the ease of breathability for both standards.

Figure 2:
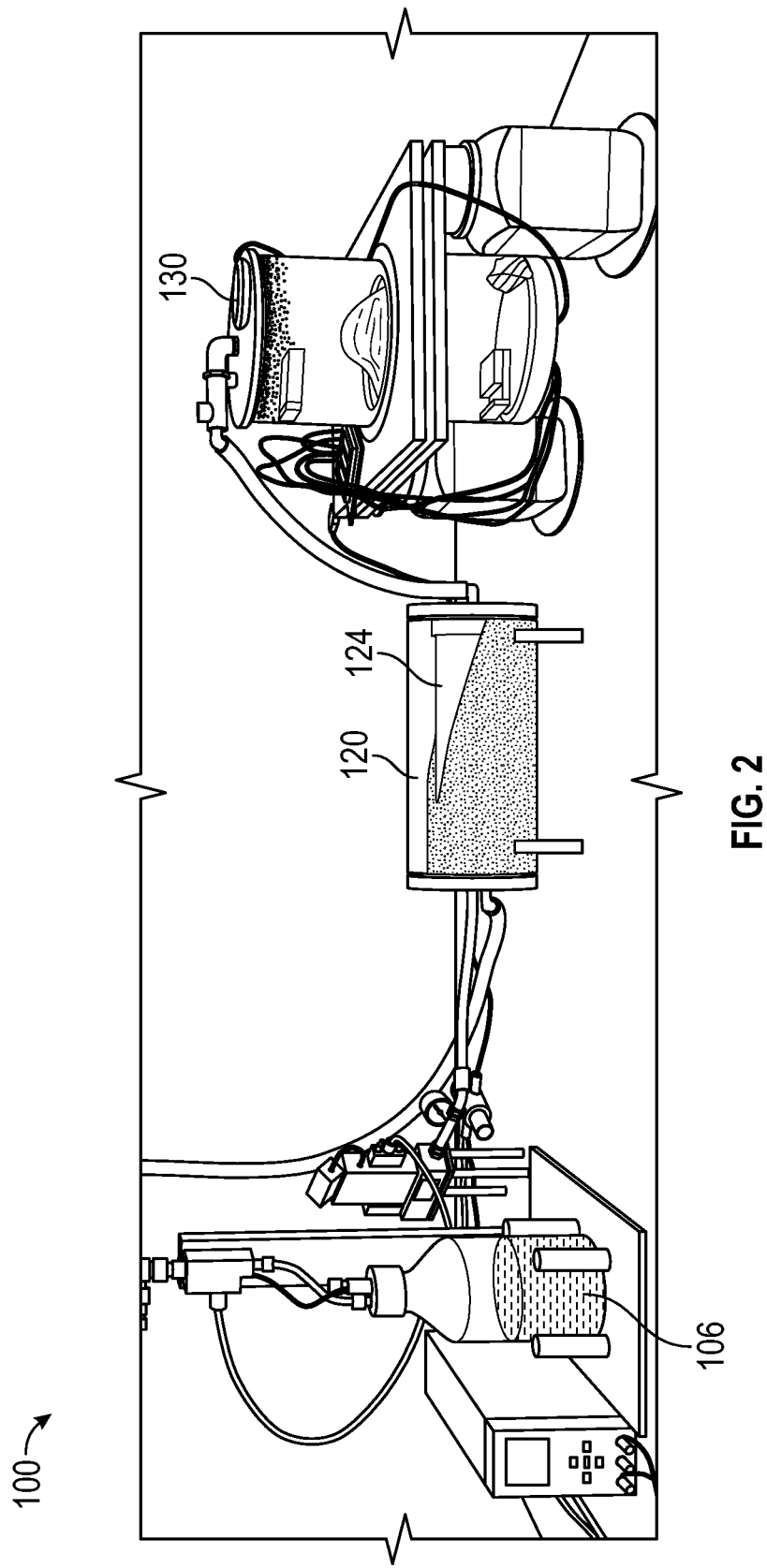
FIG. 2 illustrates a side view image of the system of FIG. 1, in accordance with the present disclosure.
Figure 3:
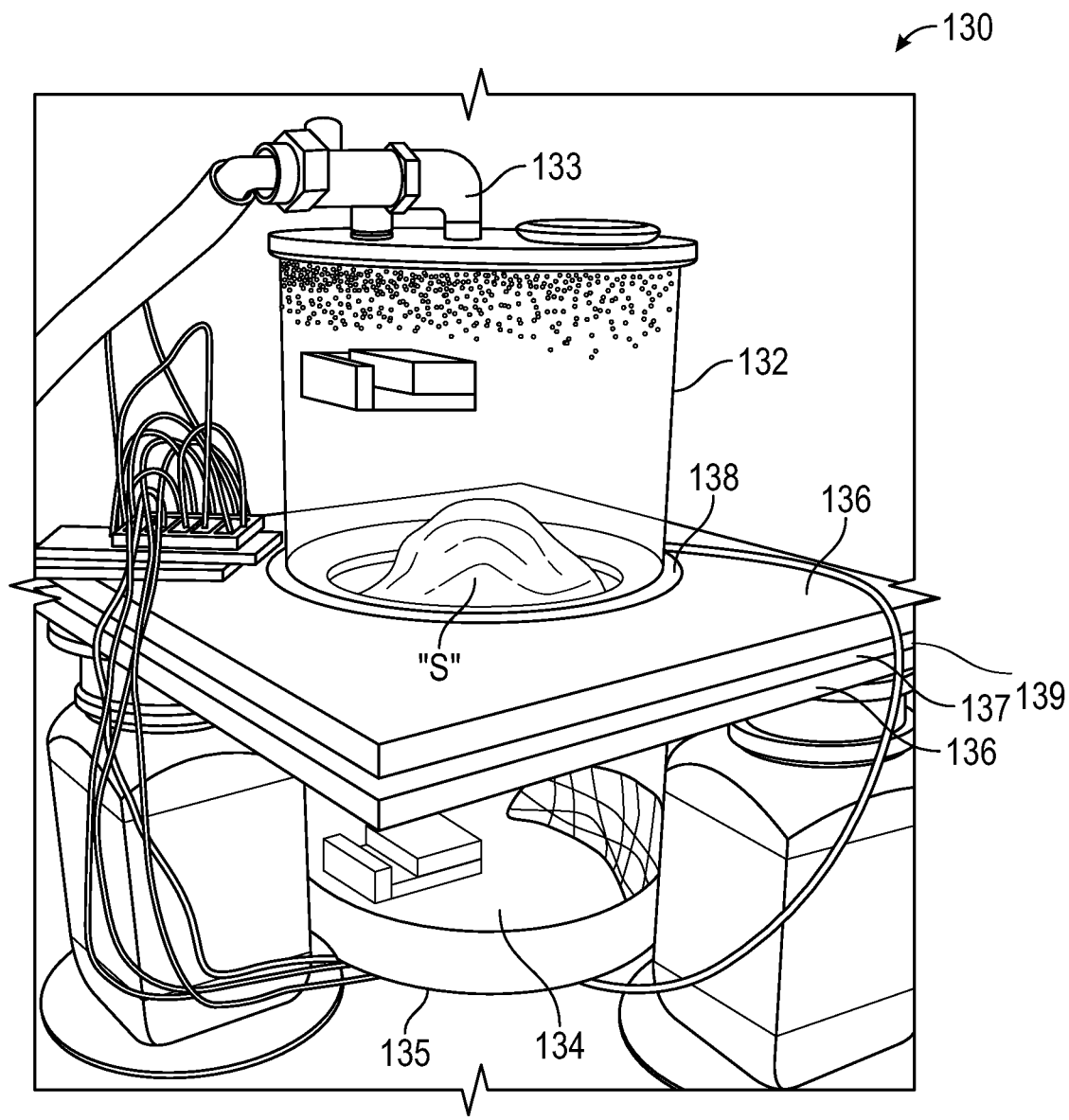
FIG. 3 is a detailed view of a respirator chamber image of the system of FIG. 1, in accordance with the present disclosure.
Figure 4:
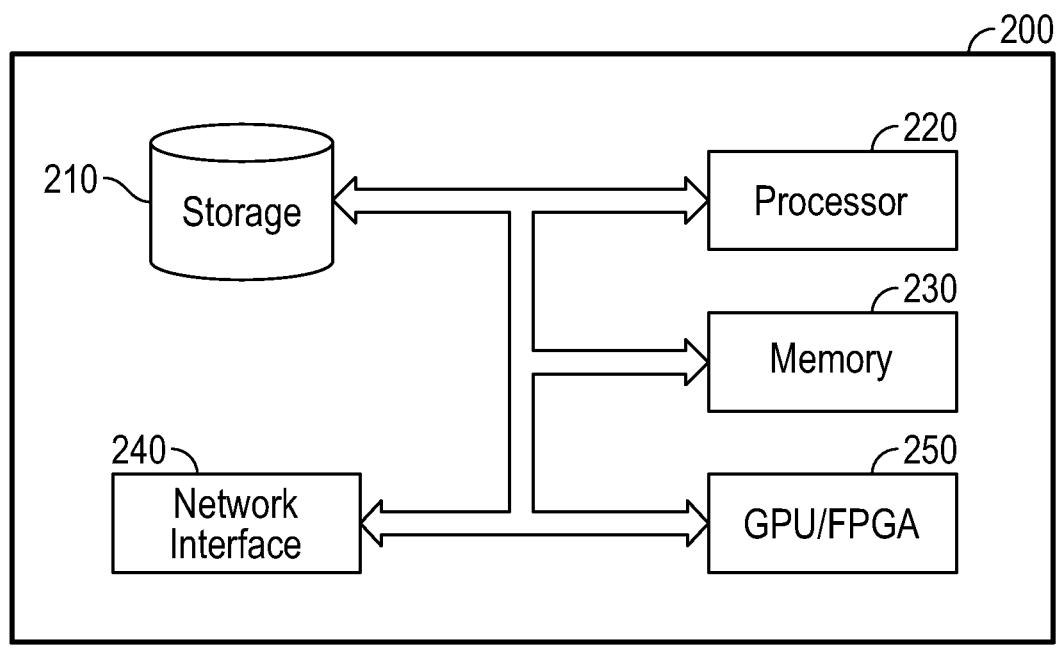
FIG. 4 is a block diagram of a controller configured for use with the system of FIG. 1, in accordance with aspects of the disclosure.

Referring to FIGS. 1-3, a system 100 for the evaluation of respirator materials is shown. The system 100 is configured for performing low-cost evaluation of respirator materials according to NIOSH standards. The system 100 generally includes an aerosolized particle source 110, a mixing chamber 120, a vacuum source 146 configured to control airflow, an airtight respirator chamber 130, and a controller 200 (FIG. 4). The system 100 provides the benefit of providing good test results at low airflow rates of 30 lpm.

The disclosed system 100 provides a low-cost way of measuring and evaluating materials for respirators, especially according to NIOSH standards.

The aerosolized particle source 110 is configured to selectively provide aerosolized particles, e.g., sodium chloride (NaCl). The aerosolized particle source 110 includes an air source 102, a pressure regulator 104, and an aerosol generator 106. The air source 102 may provide air or other inert gases such as nitrogen. Particle size is configured to match NIOSH specifications at 0.075 μm. For example, the system 100 may use a 0.0004 gram per cubic centimeter NaCl concentration.

The mixing chamber 120 includes a drying apparatus 122 configured to dry the aerosols. The drying apparatus 122 may be any suitable shape, such as cylindrical, with an inlet and an outlet at either end. The drying apparatus 122 may be made of acrylic. The drying apparatus 122 may include anhydrous crystals such as silica gel. Although silica gel is used as an example, other anhydrous crystals are contemplated. The anhydrous crystals may be held in place with a wire mesh 124 (FIG. 2). The drying apparatus 122 may include an inlet 108 for ambient air. The inlet 108 for ambient air is configured to ensure there is enough flow to challenge the sample. It is necessary to dry the aerosols before the aerosols challenge the sample "S" per NIOSH standards. The aerosolized particle source 110 may be connected to the mixing chamber 120 using flexible tubing. The aerosolized particle source 110 may include a combination of quick disconnect and barbed fittings to allow for aerosol and airflow tubing connections in and out of the aerosolized particle source 110.

The respirator chamber 130 is configured to house the sample to be evaluated (e.g., a respirator or other sample) and includes a first sub-chamber 132, and a second sub-chamber 134. The first sub-chamber 132 and the second sub-chamber 134 each include a plate 136 (FIG. 3). Each plate 136 includes a through hole 138, approximately located in a center portion of the plate 136. The through hole 138 is configured to enable the exposure of a portion of a sample "S" (e.g., the respirator or material) to the aerosolized particles during the test. The plate 136 may be constructed of any suitable material, for example, acrylic or aluminum. Other suitable materials are contemplated. Unlike existing systems that use pneumatics with safety switches to open and close the chamber, the respirator chamber 130 of system 100 is configured to be manually closed around the sample "S". By being manually closed, the respirator chamber 130 provides the benefit of being safe to operate while not requiring safety switches to keep the user's fingers from getting injured or amputated by the closing of the two halves 132, 134 of the chamber 130.

The first sub-chamber 132 includes a port 133 configured to supply the aerosolized particles during test. The second sub-chamber 134 includes a port 135 configured to enable the now filtered air a means for exiting the second sub-chamber 134 during test. The mixing chamber 120 may be connected to the respirator chamber 130 using flexible tubing. The first sub-chamber 132 and second sub-chamber 134 may be comprised of plexiglass.

During testing with the sample "S" is housed in the airtight respirator chamber 130. The respirator chamber 130 includes a gasket 137 (e.g., one or more foam sheets). For example, two foam sheets adhered to the plates 136 may be utilized to provide an airtight seal when the plates are in compression due to the vacuum flow. This clampless system provides the benefit of ease of use and lower complexity and cost. The sample "S" (e.g., the respirator material) is located in between the two foam sheets and halves (i.e., the first sub-chamber 132 and the second sub-chamber 134) of the respirator chamber 130. The respirator chamber 130 may include a combination of quick disconnect and barbed fittings to allow for aerosol and airflow tubing connections in and out of the respirator chamber 130. The respirator chamber 130 may include ledges or other fittings for mounting various sensors. A detailed view of the respirator chamber 130 is provided in FIG. 3. In aspects, the sample may be adhered to an aluminum plate 139 sandwiched between the plates 136 using hot glue or other adhesive. Aluminum plate 139 may be configured to enable the exposure of a portion of the sample "S."

The respirator chamber 130 may include a differential pressure sensor 152 configured to perform resistance measurements by measuring the differential pressure across the sample "S." The differential pressure sensor 152 includes two ports, one of which connects to the first sub-chamber 132 and one of which connects to the second sub-chamber 134. In aspects, the differential pressure sensor 152 may have an operating range of about ±254 mmH2O. The differential pressure sensor 152 may communicate with the controller 200 using at least one of I²C communication or UART communication.

The respirator chamber 130 includes a first particulate matter sensor 150 and a second particulate matter sensor 150 (i.e., the PM sensors 150) configured for aerosol detection. The PM sensors 150 may use near forward, light scattering photometer where light intensity is measured and directly proportional to the mass of the suspended particulate. In aspects, the PM sensors 150 may use infrared, Beta attenuation mass monitoring, and/or laser diffraction to detect particulate matter. The PM sensors 150 may communicate with the controller 200 using at least one of I²C communication or UART communication. The first particulate matter sensor 150 is disposed in the first sub-chamber 132. The first particulate matter sensor 150 is configured to generate a first signal indicating an amount of particulate matter upstream from the sample "S" during test. The second particulate matter sensor 150 is disposed in the second sub-chamber 134. The second particulate matter sensor 150 is configured to generate a second signal indicating an amount of particulate matter downstream from the sample "S" during test. In aspects, the first particulate matter sensor 150 and the second particulate matter sensor 150 are configured to measure light scattering of aerosolized particles. These sensors measure via light scattering and can detect particles in the size range of about 0.3 to about 10.0 μm. These sensors are configured to operate within a mass concentration range from about 0 to about 1,000 microgram per meter cubed. Filtering efficiency (FE) may be calculated based on the following equation:

$$FE(\%) = \left(\frac{\text{Particle Count Top} - \text{Particle Count Bottom}}{\text{Particle Count Top}}\right) * 100$$

A flow controller 148 is configured to connect to the vacuum source 146 via tubing and compression fittings. The flow controller 148 is configured to regulate the vacuum provided by the vacuum source 146.

In aspects, the vacuum source 146 may include an air source 102, a venturi vacuum pump, and an exhaust 149 configured to exhaust the excess airflow.

In aspects, the vacuum source 146 may be a venturi vacuum pump configured to generate a vacuum based on the airflow. The venturi vacuum pump uses positive pressure to generate a suction flow capable of reaching about 85 lpm in accordance with NIOSH procedures. In aspects, the vacuum source 146 or the venturi vacuum pump may be set to 30 lpm. The disclosed system 100 provides the benefit of testing at the slower flow rate of 30 lpm as opposed to existing systems that test at a flow rate of 85 lpm which are directed to the NIOSH standard. The disclosed system 100 provides the benefit of utilizing inexpensive typical laboratory vacuum sources that can easily provide sufficient vacuum to perform testing on samples "S".

In aspects, instead of the flow controller 148, the system 100 may include a pneumotachometer 142 configured to measure the flowrate of the airflow. The pneumotachometer 142 may be used to measure a resistance that could be related to the air flow rate.

In aspects, the system 100 may include a filter 144 configured to prevent NaCl aerosols that pass through from reaching a flow controller 148 or the venturi vacuum pump and cause damage. The filter 144 may be disposed on an outlet of the pneumotachometer 142 or at an outlet of the respirator chamber 130.

FIG. 4 illustrates controller 200 which includes a processor 220 connected to a computer-readable storage medium or a memory 230. The controller 200 may be used to control and/or execute operations of the networked system 100. The computer-readable storage medium or memory 230 may be a volatile type of memory, e.g., RAM, or a non-volatile type of memory, e.g., flash media, disk media, etc. In various aspects of the disclosure, the processor 220 may be another type of processor, such as a digital signal processor, a microprocessor, an ASIC, a graphics processing unit (GPU), a field-programmable gate array (FPGA), or a central processing unit (CPU). In certain aspects of the disclosure, network inference may also be accomplished in systems that have weights implemented as memristors, chemically, or other inference calculations, as opposed to processors.

In aspects of the disclosure, the memory 230 can be random access memory, read-only memory, magnetic disk memory, solid-state memory, optical disc memory, and/or another type of memory. In some aspects of the disclosure, the memory 230 can be separate from the controller 200 and can communicate with the processor 220 through communication buses of a circuit board and/or through communication cables such as serial ATA cables or other types of cables. The memory 230 includes computer-readable instructions that are executable by the processor 220 to operate the controller 200. In other aspects of the disclosure, the controller 200 may include a network interface 240 to communicate with other computers or to a server. A storage device 210 may be used for storing data. The disclosed method may run on the controller 200 or on a user device, including, for example, on a mobile device, an IoT device, or a server system.

Referring to FIG. 5, a flow diagram for a method in accordance with the present disclosure for respirator evaluation is shown as 500. Although the steps of FIG. 5 are shown in a particular order, the steps need not all be performed in the specified order, and certain steps can be performed in another order. For example, FIG. 5 will be described below, with a controller 200 of FIG. 4 performing the operations. In aspects, the operations of FIG. 5 may be performed all or in part by another device, for example, a server, and/or a computer system. These variations are contemplated to be within the scope of the present disclosure.

Prior to testing, a sample to be tested may be environmentally conditioned. For example, respirators and materials may be thermal conditioned per NIOSH protocols prior to testing. Conditioning may be performed for 25±1 hours (h) at 38.5±2.5° C. and 85±5% relative humidity. The sample "S" may then be sealed in a gas tight container and tested within ten hours. In aspects, the GB2626-2019 protocol may be followed, for example when testing KN95s. This protocol differs from NIOSH protocol and calls for a three step conditioning process beginning with the respirators being exposed to 38.5±2.5° C. and 85±5% relative humidity for 24±1 h. This is followed by conditioning for 24±1 h in a 70±3° C. dry environment and then another 24±1 h at −30±3° C.

In aspects, the sample "S" is mounted to the plate, for example using hot glue. The edges of the sample "S" is sandwiched between the plates and gaskets of the first sub-chamber 132 and the second sub-chamber 134 of the airtight respirator chamber. The aluminum plate includes a through hole in the middle portion to enable a portion of the sample to be exposed to the aerosolized particles. Although the through hole is shown as round, other suitable shapes such as oval or even rectangular are contemplated. The flow rate and the through hole area are configured to enable a 10 centimeter per second face velocity, the flow rate for official NIOSH testing.

In aspects, a penetration calibration and light scattering chamber (LSC) calibration is performed by the system 100 in order to confirm airflow and aerosol detection.

At step 502, an aerosolized particle source 110 supplies aerosolized particles to the mixing chamber 120 (FIG. 1).

At step 504, the system 100 dries the aerosolized particles using mixing chamber 120 (FIG. 1).

At step 506, the system 100 controls airflow of the aerosolized particles using a flow controller of vacuum source 146 (FIG. 1). For example, the rate of the airflow may be about 30 lpm. Although 30 lpm is used as an example, other rates of airflow are contemplated.

At step 508, the system 100 supplies the aerosolized particles to the respirator chamber 130. For example, the aerosols are loaded on the sample "S" for a period of time (e.g., about 110 seconds) that provides enough time for the aerosol loading and various sensor measurements to reach steady state.

At step 510, the system 100 generates, by a first sensor, a first signal indicating an amount of particulate matter upstream from the sample respirator material being evaluated.

At step 512, the system 100 generates, by a second sensor, a second signal indicating an amount of particulate matter downstream from the sample.

At step 514, the system 100 determines an aerosol filtration efficiency based on a difference between the first signal and second signal. In aspects, the system 100 may generate a signal indicating differential pressure across the sample "S" using the differential pressure sensor 152 (FIG. 1). The signal indicating differential pressure may be used by the system 100 to determine IR of the sample.

At step 516, the system 100 compares the aerosol filtration efficiency to a predetermined threshold. In aspects, flow rate, FE, and IR, as well as more detailed particle count data may be determined at regular periodic intervals (e.g., about every 2 seconds). For example, the threshold may include the 95% FE that is specified by NIOSH and/or the calculated FE requirement based on the reduced flow rate.

At step 518, the system 100 provides an indication whether the aerosol filtration efficiency is above or below the predetermined threshold. For example, the indication may be displayed on a display. In another example, the indication may be displayed using LEDs. For example, if the aerosol concentration is above the predetermined threshold, a red LED may be displayed. In another example, the exact aerosol concentration may be displayed alongside the predetermined threshold value with an indication as to whether the sample passed regulatory standards. The system 100 determines the IR and the FE of a sample and is able to provide the IR and/or FE to a user (e.g., displayed on a display or recorded for later use) for evaluation of the respirator materials (i.e., sample "S").

Figure 6:
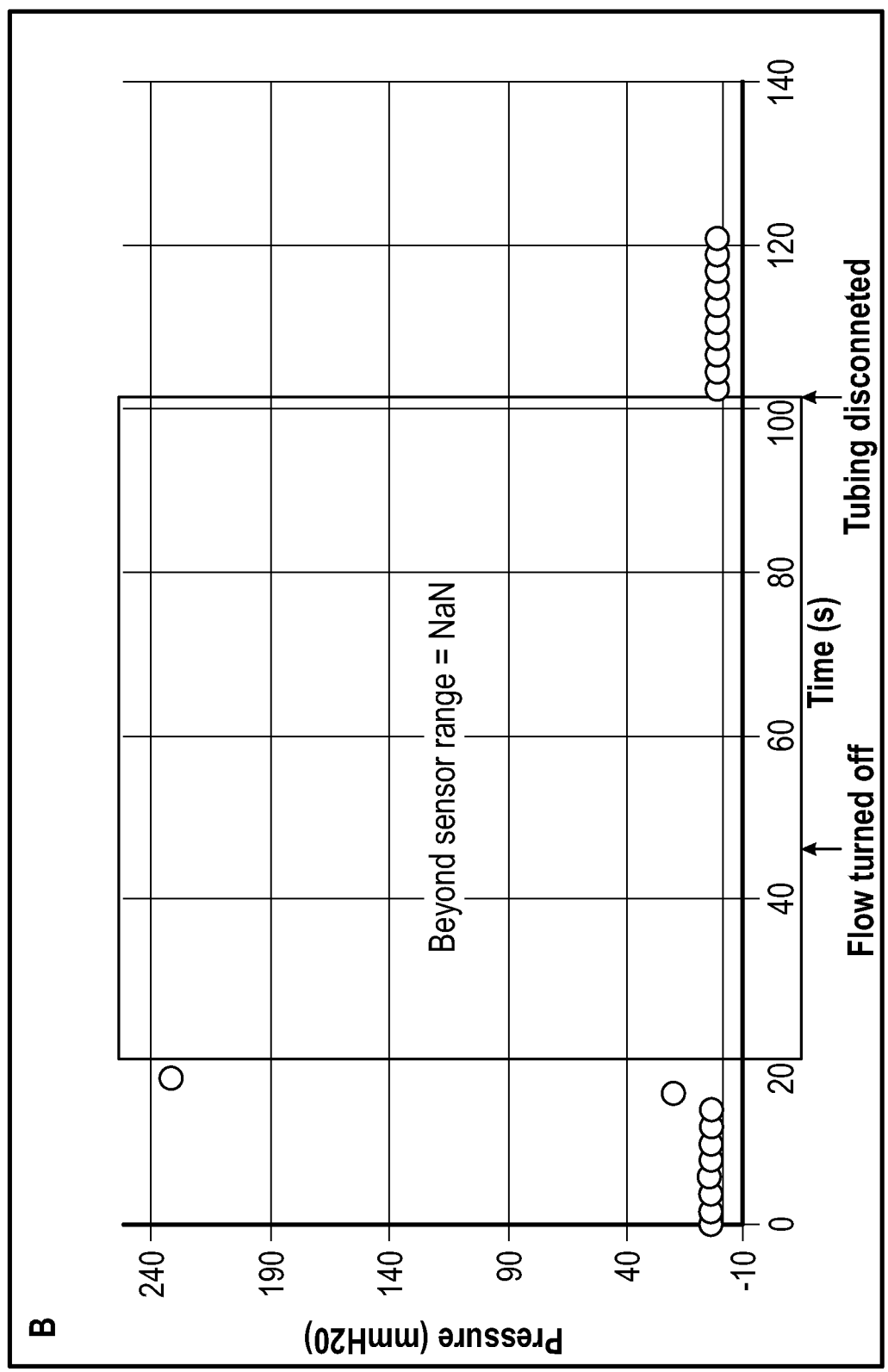
FIG. 6 is a graph showing leak test data for the respirator chamber of the system of FIG. 1, in accordance with aspects of the disclosure.

Referring to FIG. 6, a graph showing leak test data for the respirator chamber 130 of the system of FIG. 1 is shown. Leakage testing was performed for the system 100 with an aluminum sheet blocking airflow within the respirator chamber 130. During suction flow, pressure remained constant until the tubing was disconnected, indicating no leaks present.

Referring to FIGS. 7A and 7B, test data for the various sensors is shown. FIG. 7A illustrates differential pressure sensor 152 pressure baseline results for each test day. This step was done before testing on the system 100 (FIG. 1) to set the baseline values on the used by the controller 200 (FIG. 4) and calibrate the differential pressure sensor 152 to zero.

FIG. 7B illustrates the results of the first particulate matter sensor 150 and the second particulate matter sensor 150 verification for each test day. This testing ensured that the two particulate matter sensors 150 were performing within the acceptable tolerance of approximately 5% of each other.

Figure 8A:
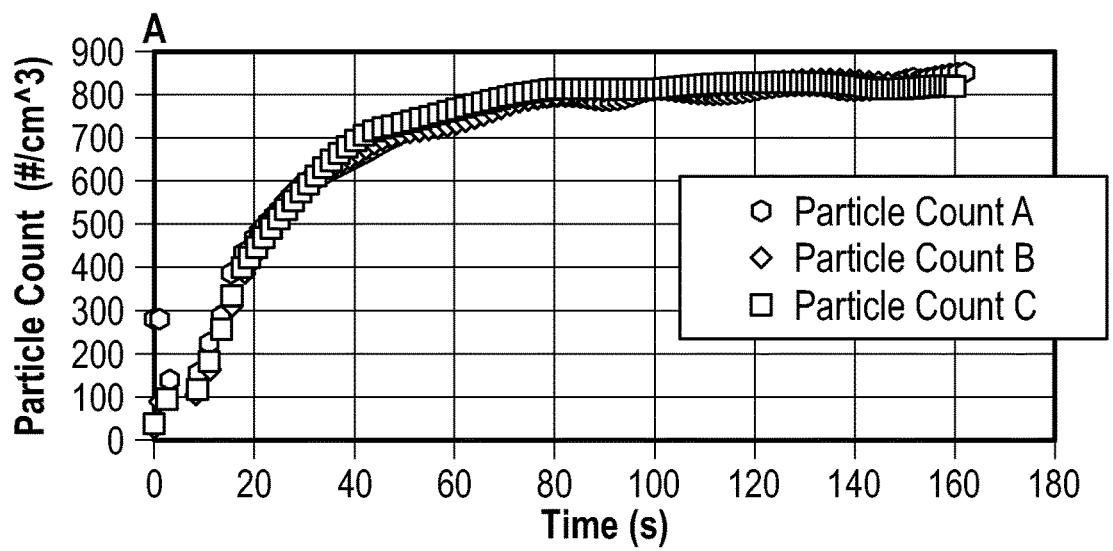
FIGS. 8A to 8C are graphs illustrating the results of steady-state testing on the system of FIG. 1, in accordance with aspects of the disclosure.
Figure 8B:
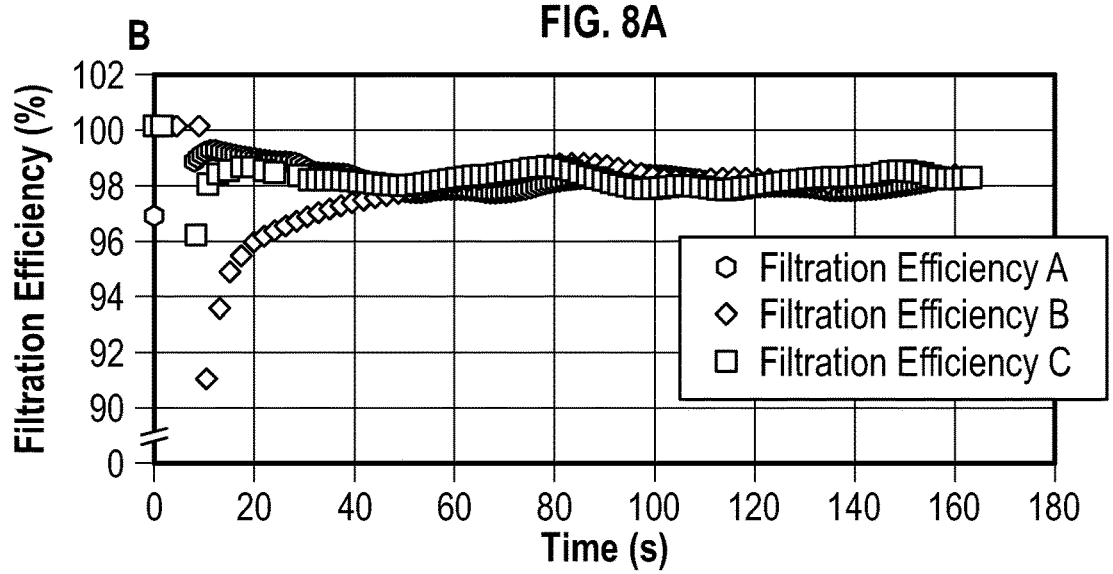
Figure 8C:
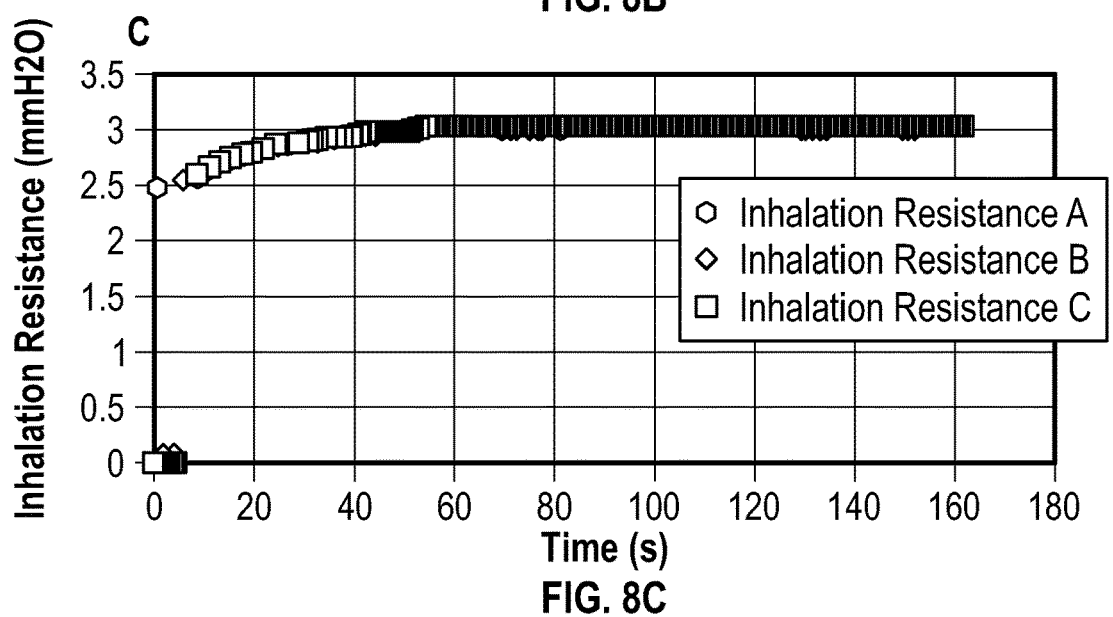

Referring to FIGS. 8A to 8C, results of steady-state testing on the system 100 are shown. This testing was performed at about 30 lpm for three trials and found the time when the stationary point of particle count over time (FIG. 8A) was found, as well as the stationary point of FE over time (FIG. 8B) and IR over time (FIG. 8C). Ultimately, steady state was determined to occur at about 100 seconds.

Figure 9A:
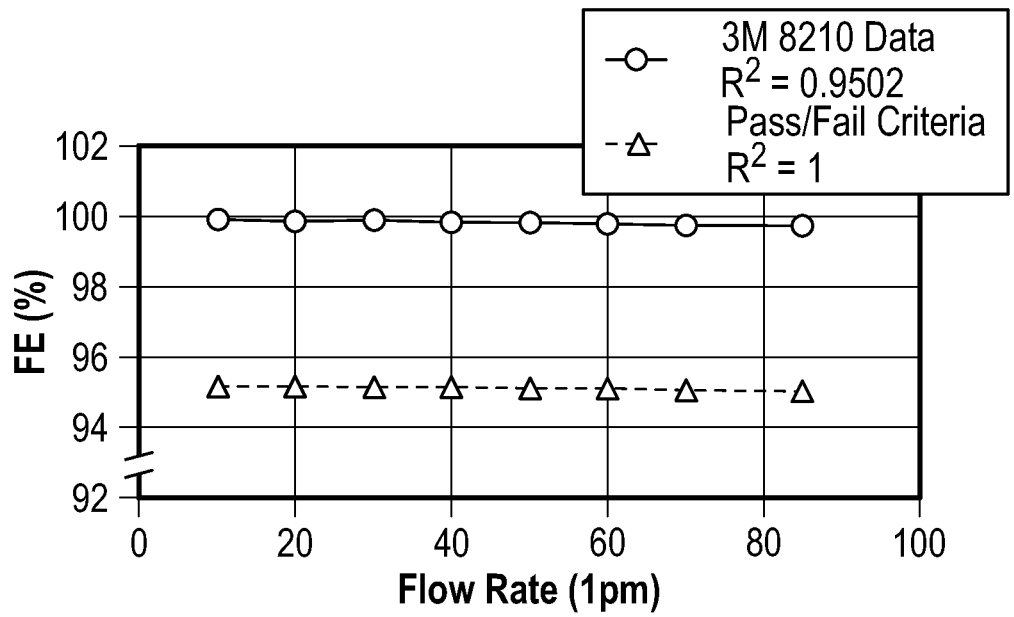
FIG. 9A is a graph showing the average filtering efficiency vs. flow rate for a set of samples, in accordance with aspects of the disclosure.
Figure 9B:
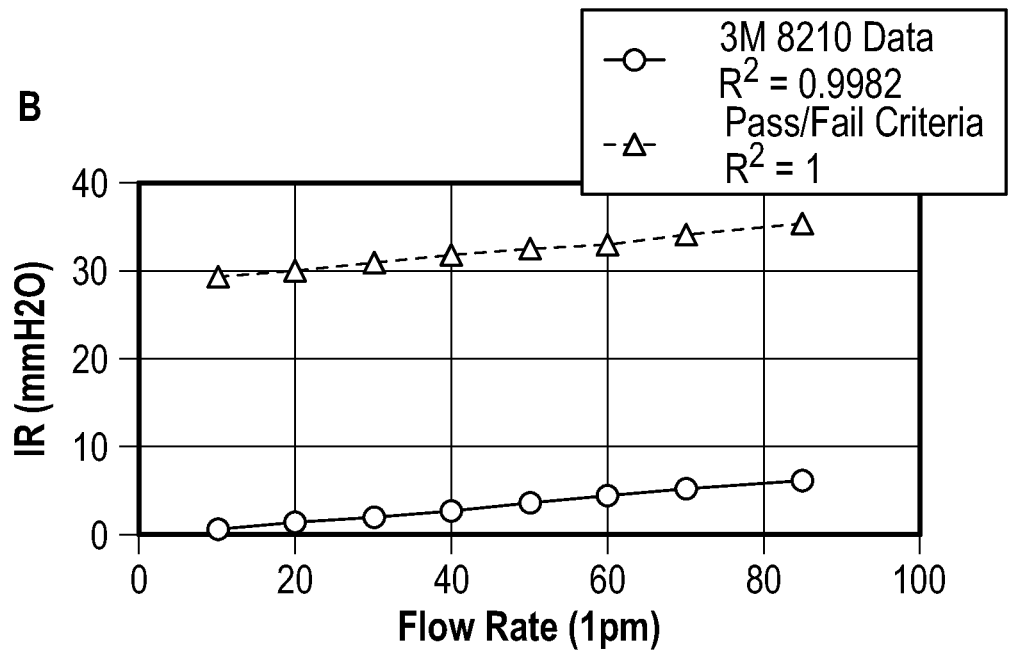
FIG. 9B is a graph showing the average inhalation resistance vs. flow rate for a set of samples, in accordance with aspects of the disclosure.

Referring to FIGS. 9A and 9B, the average FE of the N95s (n=3) is plotted against flow rate (FIG. 9A) and IR plotted against flow rate for the same respirators (FIG. 9B). Linear trendlines were fit to the data and lines with the same slope were then plotted at current NIOSH criteria at 85 lpm (95% for FE, 35 mmH$_2$O for IR). Using these new lines with the same slope, the corresponding pass/fail criteria at 30 lpm were determined.

Certain embodiments of the present disclosure may include some, all, or none of the above advantages and/or one or more other advantages readily apparent to those skilled in the art from the drawings, descriptions, and claims included herein. Moreover, while specific advantages have been enumerated above, the various embodiments of the present disclosure may include all, some, or none of the enumerated advantages and/or other advantages not specifically enumerated above.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

It should be understood the foregoing description is only illustrative of the present disclosure. Various alternatives and modifications can be devised by those skilled in the art without departing from the disclosure. Accordingly, the present disclosure is intended to embrace all such alternatives, modifications, and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A system for evaluation of respirator materials, the system comprising:
   an aerosolized particle source configured to selectively provide aerosolized particles;
   a mixing chamber including a drying apparatus;
   a vacuum source configured to control airflow, wherein the vacuum source includes a venturi vacuum pump uses positive pressure to generate a suction flow;
   an airtight respirator chamber including:
      a first sub-chamber;
      a first sensor configured to generate a first signal indicating an amount of particulate matter upstream from a sample respirator material being evaluated, the first sensor disposed in the first sub-chamber;
      a second sub-chamber; and
      a second sensor configured to generate a second signal indicating an amount of particulate matter downstream from the sample respirator material, the second sensor disposed in the second sub-chamber;
   a processor; and
   a memory including instructions stored thereon, which when executed by the processor, cause the system to:
      obtain the first signal and the second signal;
      determine an aerosol filtration efficiency based on a difference between the first signal and second signal;
      compare the aerosol filtration efficiency to a predetermined threshold; and
      provide an indication whether the aerosol filtration efficiency is above or below the predetermined threshold.

2. The system of claim 1, wherein the first sensor and the second sensor are configured to measure light scattering.

3. The system of claim 1, wherein a rate of the airflow is about 30 lpm.

4. The system of claim 3, wherein the airtight respirator chamber further includes:
   a first plate;

a second plate configured to be compressed to the first plate; and a plurality of gaskets disposed on the first plate and the second plate, the plurality of gaskets configured to provide an airtight seal when in compression based on the airflow.

5. The system of claim 4, wherein the aerosolized particle source includes:

an air source;

a pressure regulator; and an aerosol generator.

6. The system of claim 4, wherein the drying apparatus includes silica gel.

7. The system of claim 4, wherein prior to testing, the sample respirator material is environmentally conditioned.

8. The system of claim 1, wherein the aerosolized particles include neutralized sodium chloride.

9. The system of claim 1, wherein a size of the aerosolized particles is a geometric mean of about 0.075 μm and a geometric standard deviation of about 2.

10. The system of claim 1, wherein the first sensor and the second sensor are configured to detect aerosolized particles in a range of about 0.3 to about 10.0 μm.

11. A processor implemented method for evaluating respirator materials, the method comprising:

supplying aerosolized particles by an aerosolized particle source, wherein the airflow of the aerosolized particles is controlled by a vacuum source, wherein the vacuum source includes a venturi vacuum pump uses positive pressure to generate a suction flow;

drying the aerosolized particles by a mixing chamber including a drying apparatus;

supplying the aerosolized particles to an airtight respirator chamber;

generating, by a first sensor, a first signal indicating an amount of particulate matter upstream from a sample respirator material being evaluated, wherein the first sensor is disposed in a first sub-chamber of the airtight respirator chamber;

generating, by a second sensor, a second signal indicating an amount of particulate matter downstream from the sample respirator material, wherein the second sensor is disposed in a second sub-chamber of the airtight respirator chamber;

determining an aerosol filtration efficiency based on a difference between the first signal and second signal;

comparing the aerosol filtration efficiency to a predetermined threshold; and providing an indication whether the aerosol filtration efficiency is above or below the predetermined threshold.

12. The method of claim 11, wherein the amount of particulate matter measured by the first sensor and the second sensor are measured using light scattering.

13. The method of claim 11, further comprising:

controlling rate of the airflow to about 30 lpm.

14. The method of claim 11, wherein the aerosolized particles include neutralized sodium chloride.

15. The method of claim 11, wherein the first sensor and the second sensor are configured to sense aerosolized particles with a geometric mean of about 0.075 μm and a geometric standard deviation of about 2.

16. The method of claim 11, wherein the first sensor and the second sensor are configured to detect particles in a range of about 0.3 to about 10.0 μm.

17. The method of claim 11, further comprising:

manually compressing the sample between a first plate and a second plate of the airtight respirator chamber, wherein a plurality of gaskets are disposed on the first plate and the second plate, the plurality of gaskets configured to provide an airtight seal when in compression based on the airflow.

18. The method of claim 17, wherein the drying apparatus dries the aerosolized particles using silica gel.

19. The method of claim 17, further comprising, prior to testing, environmentally conditioning the sample.

20. A non-transitory computer-readable medium storing instructions that, when executed by a processor, cause the processor to perform a method for evaluation of respirator materials, the method comprising:

supplying aerosolized particles by an aerosolized particle source;

drying the aerosolized particles by a mixing chamber including a drying apparatus;

controlling airflow of the aerosolized particles by a vacuum source, wherein the vacuum source includes a venturi vacuum pump uses positive pressure to generate a suction flow;

supplying the aerosolized particles to an airtight respirator chamber;

generating, by a first sensor, a first signal indicating an amount of particulate matter upstream from a sample respirator material being evaluated, wherein the first sensor is disposed in a first sub-chamber of the airtight respirator chamber;

generating, by a second sensor, a second signal indicating an amount of particulate matter downstream from the sample, wherein the second sensor is disposed in a second sub-chamber of the airtight respirator chamber;

determining an aerosol filtration efficiency based on a difference between the first signal and second signal;

comparing the aerosol filtration efficiency to a predetermined threshold; and providing an indication whether the aerosol filtration efficiency is above or below the predetermined threshold.

* * * * *